April 14, 1964     R. ALTER     3,128,745

NIBBLER VALVE

Filed Nov. 8, 1960

RAYMOND ALTER
INVENTOR.

BY Howard K Rogers

United States Patent Office 3,128,745
Patented Apr. 14, 1964

3,128,745
NIBBLER VALVE
Raymond Alter, Darien, Wis.
Filed Nov. 8, 1960, Ser. No. 68,126
1 Claim. (Cl. 119—75)

My invention relates to a nibbler valve for watering animals such as poultry, rabbits and the like.

The valve of my invention is one designed to be attached to a reservoir, a pipe or some form of central watering system but in the particular illustrated embodiment is particularly adapted for attachment to organic tubing such as polyethylene or rubber whereby a plurality of such valves may be attached over a length of such tubing with great ease and at any desired location along the length thereof.

Among the objects and advantages of my invention may be particularly mentioned its great simplicity, its low cost, its assurance of proper operation, its ease of operation by the smallest of animals and its above-described easy insertion into organic tubing.

Valves meeting the same function as my valve are presently on the market, but these valves, to my observation, are uniformly complex and therefore expensive and subject to malfunction. The valve of my invention consists of only four elements, each of which is a very simple machined item or an item of stock supply. I am enabled to use these few simple parts because of a dependence on a somewhat different method of valve operation from those others I have observed. Of course the fewer and simpler the parts the less likelihood there is of possible valve failure.

Other objects and advantages of my invention will be apparent from the following description and drawings of which:

Figure 4:
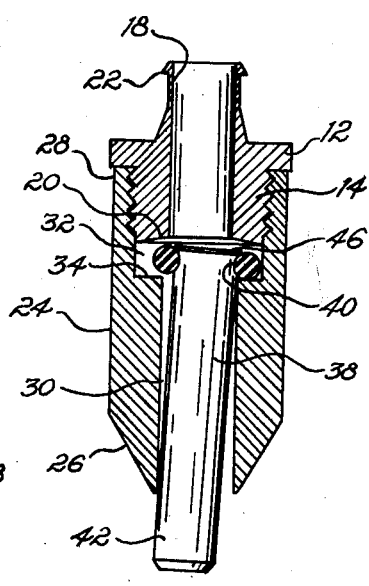
FIG. 4 is a section taken substantially along the line 4—4 of FIG. 3 looking in the direction of the arrows.

The illustrated embodiment of my valve consists of a brass or other non-corroding metal base 10 having a central circular flange 12, an externally threaded boss 14 on one side of the flange 12 and a shank 16 on the other side of the flange. The base has an axial, relatively large hole or inlet 18 extending therethrough. The outer face 20 of the boss 14 may be inwardly dished somewhat as is best seen in FIG. 4. The shank is thin-walled and terminates in a backwardly directed lip 22.

The body 24 of my valve is a generally cylindrical member having a conical lower end 26. The body is tubular, having a lareg diameter bore 28 in the upper end thereof and an outlet or valve stem passage 30 of less diameter in the lower end. The upper portion of bore 28 is internally threaded to receive boss 14 of base 10. The lower portion of bore 28 defines a valve chamber 32. A machined shoulder or valve seat 34 marks the separation between the passage 30 and the valve chamber 32.

A valve member 36 constitutes the third element of my device. The valve member consists of a stem 38 which is a length of rod having a groove 40 thereabout immediately adjacent its upper end. The valve stem is proportioned to be contained loosely within the outlet or passage 30 so that appreciable lateral movement of the stem may take place within the passage. The valve stem should be appreciably longer than the distance from the face 20 of the boss to the outer end of outlet 30 so as to protrude out of it substantially as at 42.

Figure 1:
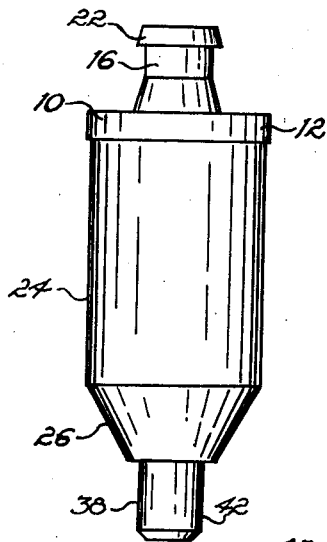
FIG. 1 is a side elevation of a valve embodying my invention.
Figure 2:
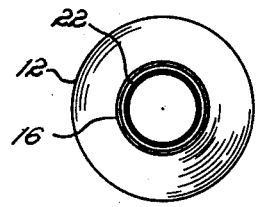
FIG. 2 is a top plan view of the valve of FIG. 1.
Figure 3:
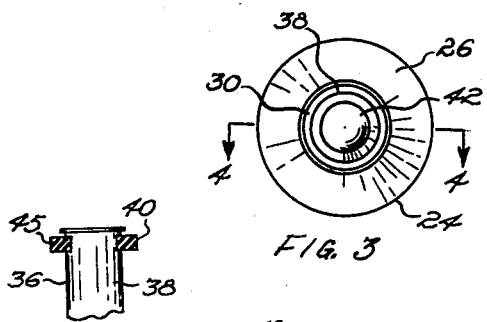
FIG. 3 is a bottom plan view thereof.
Figure 6:
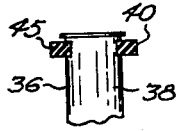
FIG. 6 is an elevation of an alternative form of valve.
Figure 5:
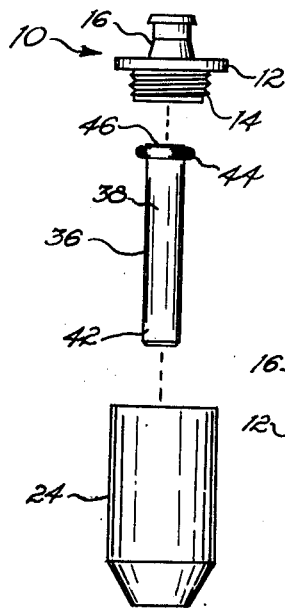
FIG. 5 is an exploded view thereof.

The valve member 36 also includes an O-ring 44 or flat washer 45 (FIG. 6) formed of neoprene or the like which is seated in groove 40. The groove 40 will have a concave section for use with the O-ring and a close fitting rectangular section for use with the washer. The O-ring and washer serve identical functions and may be generically identified as washers. These washers have an interior diameter slightly less than the diameter of the receiving grooves so that they are slightly stretched when in the grooves to make a good seal thereagainst. The section of the O-ring is sufficiently great to lap over and seat on the shoulder 34 and retain the valve stem 38 within the valve chamber 32.

The assembly of my device will be readily appreciated from the description and drawings. The valve member 36 with the washer uppermost will be dropped into the valve stem passage 30, the washer coming to rest against shoulder 34, and the base then threaded on to the body. Flange 12 intercepts the upper edge of the valve body to limit the insertion of the base and determine the proper chamber size.

In establishing a watering system for poultry, for instance, a length of plastic pipe will be extended through a poultry house or yard and connected to a source of water. Thereafter holes may be punched or drilled through the wall of the pipe at any desired place and the shank 18 forced into the hole so formed. The lip 22 will hold the valve base firmly within the hole in the pipe. When pressure is applied to the water line the pressure against the upper inside end of the valve stem 38 will force the washer down against the shoulder 34 and seal off any escape of liquid through the valve stem passage 30.

The operation of my device will likewise be evident. A chick, for instance, nibbling at the protruding end 42 of the valve stem will cock or tilt the valve stem so as to lift one side of the washer off the slot 34 and permit an escape of water therethrough as droplets to be drunk. The valve chamber 32 defined between the outer face 20 of boss 14 and the shoulder 34 is deep enough to permit vertical movement of the washer therewithin. This depth is necessary, of course, to permit a lifting of one side of the washer off the shoulder. It likewise, however, permits a total unseating of the washer in the event that the chick applies direct end pressure to the valve stem 38.

The diameter of the valve stem should be slightly larger than the inlet 18 in the valve base so as to forbid movement of the stem into the inlet with a consequent jamming of the valve and dislodging of the washer from its groove 40.

The valve of my invention has the advantage not only of great simplicity as described above but also is easier for small animals to adjust to. Most of the comparable valves I have seen on the market depend on an axial inward movement of a protruding member for release of water. The valve of my invention releases water upon lateral movement of the valve stem as well as inward movement thereof and therefore requires a less degree of education on the part of the animals.

Also, my valve requires less application of force than those employing an axial unseating of the valve. In my valve, a chick obtains the benefit of the leverage ratio of the valve stem length to the valve face width, whereas the other type of valve obtains no mechanical advantage. The pressure required, to be sure, is small, but the animals for which such valves are intended are very small and feeble.

It will be appreciated that I have described but one embodiment of my invention. Alternative as to structure, assembly and composition will undoubtedly suggest themselves. For instance, I have employed headed valve stems to retain the washer rather than the grooved valve stem illustrated and likewise valve stems with pilot projections extending loosely into the hole 18 of the valve base. These all work well but the illustrated form is just as satisfactory and has the advantage of cheapness.

Figure 7:
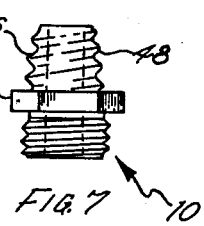
FIG. 7 is an elevation of an optional form of base for my valve.

Also, instead of the lipped shank 16 of the base, a threaded shank such as illustrated in FIG. 7 may be preferred. In this modification the shank 16 will be tapered to its outer end and have coarse exterior threads 48 thereon. Where the shank is threaded, the flange should be square or hexagonal as illustrated to turn the shank into its receptacle.

The threaded shank may be turned into a bore in plastic or other soft piping to cut its own threads and secure itself firmly in water-tight relation thereto. My shank may also be threaded for attachment to a saddle whereby my nozzle may be clamped against a pipe opening. As this alternative is well known and not relevant to my invention, detailed description is believed unnecessary.

I therefore desire that my invention be regarded as being limited only as set forth in the following claim.

I claim:

A nibbler valve comprising an upper tubular base member, a lower tubular body member, said lower tubular body member having a diametral bore in the upper end thereof, the upper portion of said diametral bore engaging the lower end of said base member to define the upper wall of a valve chamber, said base member having an axial passage defining an inlet to said valve chamber, means for connecting said inlet to a source of water under pressure, the lower portion of said diametral bore having an annular machined surface to define the lower wall of said valve chamber, the lower end of said lower tubular body member having an axial passage defining an outlet having a diameter less than the valve chamber and greater than said inlet, the intersection of the annular machined surface and the outlet in the tubular body member defining a valve chamber seat, a valve stem consisting of a length of rod contained loosely in said outlet, extending at its inner end into said chamber and at its outer end outwardly of said body member, an O-ring about said inner end lapping over said valve chamber seat and adapted to seat thereon, means on said stem for retaining said O-ring at said end, said O-ring having a diameter substantially less than the valve chamber, said stem having sufficient lateral movement in said outlet to tilt said O-ring off said seat, said stem and said outlet definnig a liquid passage to the exterior of said valve.

References Cited in the file of this patent

UNITED STATES PATENTS

| | | |
|---|---|---|
| 216,736 | Hall | June 24, 1879 |
| 703,103 | Weber | June 24, 1902 |
| 2,009,575 | Card | July 30, 1935 |
| 2,710,594 | Thompson | June 14, 1955 |
| 2,764,385 | Sieling | Sept. 25, 1956 |
| 2,785,881 | Dolan | Mar. 19, 1957 |
| 2,819,799 | Wilkerson | Jan. 14, 1958 |